Figure 1:
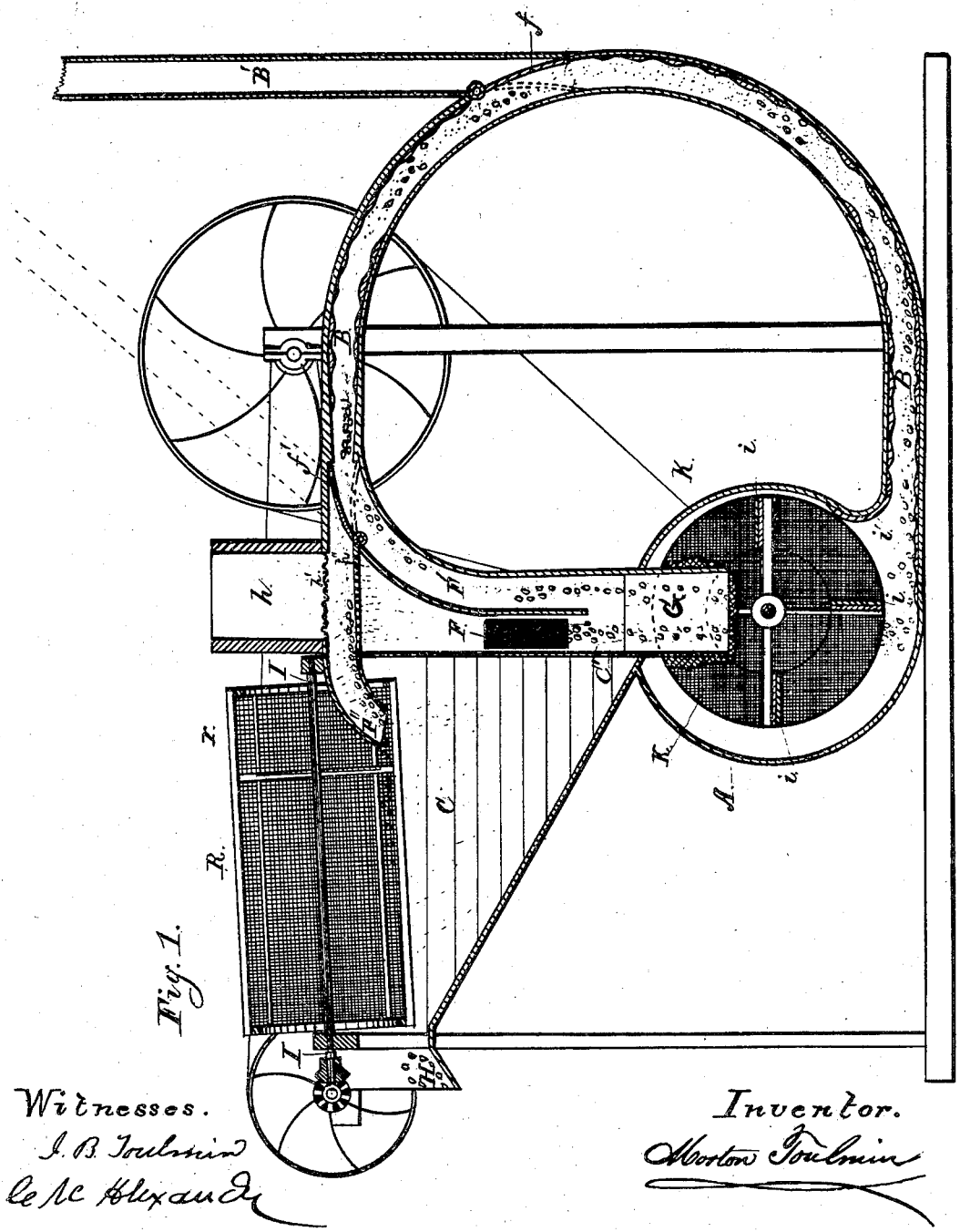

(No Model.)

2 Sheets—Sheet 1.

M. TOULMIN.
FAN BLOWER APPARATUS FOR CLEANING, SCOURING, AND ELEVATING GRAIN, &c.

No. 245,584.     Patented Aug. 9, 1881.

Witnesses.
J. B. Toulmin
C. A. Alexander

Inventor.
Morton Toulmin (No Model.) 2 Sheets—Sheet 2.
M. TOULMIN.
FAN BLOWER APPARATUS FOR CLEANING, SCOURING, AND ELEVATING GRAIN, &c.
No. 245,584. Patented Aug. 9, 1881.
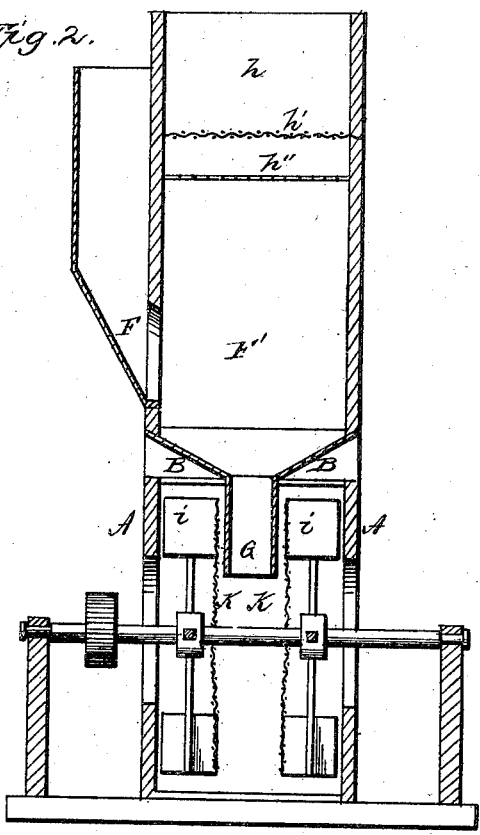
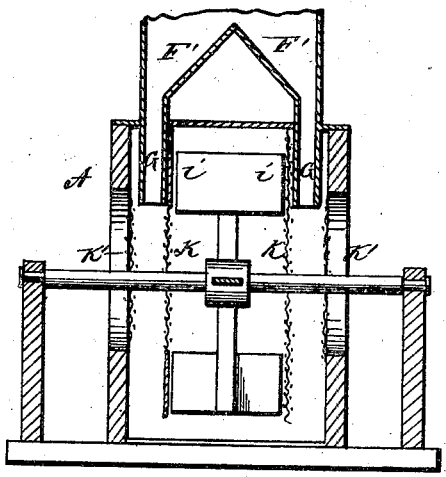
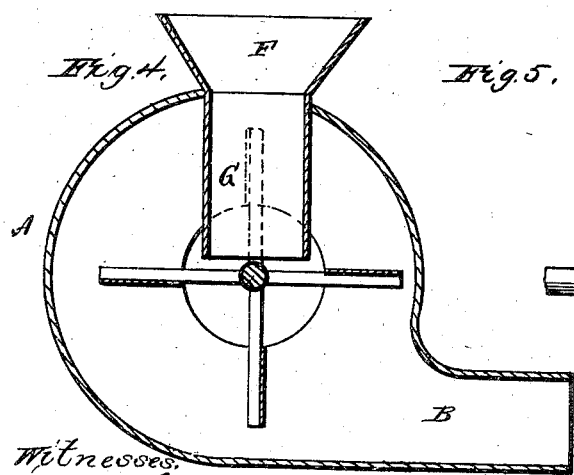
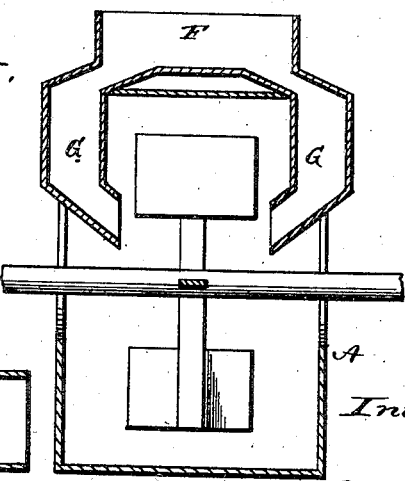

UNITED STATES PATENT OFFICE.

MORTON TOULMIN, OF MOBILE, ALABAMA, ASSIGNOR OF THREE-FOURTHS TO MILLS DEAN, OF SPARTANBURG, SOUTH CAROLINA, AND S. H. WIRES, OF NASHVILLE, TENNESSEE.

FAN-BLOWER APPARATUS FOR CLEANING, SCOURING, AND ELEVATING GRAIN, &c.

SPECIFICATION forming part of Letters Patent No. 245,584, dated August 9, 1881.

Application filed February 23, 1881. (No model.)

*To all whom it may concern:*

Be it known that I, MORTON TOULMIN, of Mobile, State of Alabama, have invented a new and useful Improvement in a Fan-Blower Apparatus, applicable to the elevation, drying, and cleaning of various produce, such as peanuts, coffee, and grain, of which the following is a specification.

The object of the invention is to construct a fan-blower in such a manner that grain or other produce can be introduced into the interior of the fan without being blown back, and out again at the place of introduction, and to have all such material acted upon efficiently, either for cleaning, drying, or elevating purposes, and without breakage or other injury, and so that it can be kept circulating in and through the machine or be discharged therefrom at will, either on a horizontal plane with the machine or at any point below or above it—say as high as the second, third, or fourth story of a building.

In order to make my invention effective in its operation in cleaning grain, coffee, &c., it is necessary to drive the same through the continuous trough B and through the fan-blower with great velocity—say as much as sixty or seventy feet per second—and to be able to retain the grain or other material in the machine and keep it flying through it at this rate of speed until the cleaning process is fully accomplished. The peculiar construction of the blower and of the curved and cushioned surfaces of the continuous trough B, hereinafter described, enables this to be done without breaking the grain.

To prevent breakage of the grain or other produce when introduced into the fan-blower while in motion, the wings of the fan are inclosed with wire-gauze, perforated sheet metal, or their equivalent, either attached to the wings of the fan and revolving with them, or so placed as to form partitions, between which they can revolve freely without obstructing the blast, and at the same time preventing the wings of the fan from striking the grain.

The continuous circulation of the blast is attained by providing the outlet of the fan-blower with a pipe or trough made in such manner that the blast and the material it is acting upon will be carried back into the blower in an endless stream, substantially as shown in the accompanying drawings, in which—

Figure 1 represents a side elevation, in section, showing the interior arrangement of the blower, trough B, and other attachments when the blower is adapted to elevating and cleaning grain or other produce. Fig. 2 is a cross-section of the blower, as I prefer to make it—viz., double—showing the pipe F' and the spout G, as constructed when the grain, &c., is to be introduced between the two sets of wings of the fan. Fig. 3 is also a cross-section of the blower when constructed with a single set of wings. In this view the pipe F' is divided so that its contents may be discharged into two spouts, G, one on either side of the single set of fan-blades, which revolve between partitions K K, and the inlet-openings of the fan are in this view provided with wire-cloth diaphragms K' K'. Figs. 4 and 5 are modifications in the arrangement of the blower and the spout or spouts G.

A is the outer casing of the fan-blower.

B is the continuous trough.

B' is the elevator-trough, having a flap-valve, *f*, arranged to be operated from the outside of the trough by a suitable handle, so that the course of the blast may be changed at will through the trough B or upward through the elevator-trough B' by simply turning this valve in the proper direction.

The dotted lines in Fig. 1 are intended to show that the grain, coffee, or other produce which is being acted upon by the fan-blast may be returned to it by means of a trough extending up as far as the top of elevator pipe or trough B', into which the contents of said pipe B' may be discharged, and fall back of its own gravity into the trough F, and thence through the spout G into the fan-blower. A screen, R, may be placed at the upper end of the trough B, and the contents of the trough discharged therein, and thence, after having been separated, be conveyed to any point desired.

As shown in the drawings, the trough B proceeds from the discharge-opening of the fan-blower a short distance in a horizontal direction. It is then curved upward, and the curve is continued until the end of the pipe B reaches the pipe F' and spout F". At the point where these pipes F' and F" meet there is another flap-valve, f', which, when turned in one direction, permits the contents of the pipe B to enter the pipe F', and if turned in the opposite direction it will enter the pipe F''', and if turned midway a part of the contents will enter each pipe F' and F''', respectively. The material which enters the pipe F''' will be discharged into the revolving screen R, and any particles of dirt which may be mixed with it will fall through the screen and upon the inclined hopper C, and will slide down until it enters the opening C', and thence through the spout G into the interior of the fan-blower, while grain, coffee, or other produce will be discharged at the other end of the screen R onto the apron H, and thence into bags or other receptacles which may be prepared to receive it.

The screen R is provided with a diaphragm, r, which is intended to check the passage of dirt or other light particles and cause it to fall on and through the bottom of the screen R. The screen R revolves on a shaft, I, which is provided with the necessary gearing to give it motion. This will vary with the size of the screen and with the nature of the materials which are to be separated.

The top and the bottom of the pipe F''', h', and h'' are of wire-gauze or perforated sheet metal. They are made in this manner so as to allow the superfluous blast to escape, and also permit the light dust or dirt to be blown out through h' and the pipe or trough h, either into a dust-room or into the outer air.

F is a hopper opening into pipe F', into which the grain or other material to be acted upon by the blower is to be introduced, and from whence it falls through the spout G into the interior of the fan. It is essential that the mouth or discharge of the spout G come below the top of the inlet-openings of the fan and as near as possible to the fan-shaft without touching it, as this causes a suction and draws the material which is introduced through the spout G into the fan.

When the blower is constructed for cleaning purposes, and not simply for elevating and drying, I provide the interior of the pipe or trough B with slightly-corrugated or undulating surfaces, which should be of some abrasive substance, and made either permanent or removable. Among the number of things which can be used to advantage are stone, natural or artificial, pieces of solid emery of the proper shape, india-rubber, wood covered with a coating of sand or of emery.

The blades of the fan I find best to cover with some tough elastic material, as shown at i, as well as the outlet-opening of the fan, where it joins the pipe B, as shown at i', Fig. 1, as leather or india-rubber.

There are several modifications which can be made in the construction of the blower without departing from my invention.

To clean grain, peanuts, or coffee I introduce the same into the hopper F, and when the blast is put in operation the grain, peanuts, or coffee is put in rapid motion in and through the trough B, and the cleaning of the grain or nuts is accomplished by their friction against each other, and against the undulating and abrasive surfaces of the trough, and should any fine particles of abrasive material be introduced into the blower, it will aid and expedite the operation, and will remain in the machine as long as it may be desired to keep it there, or be discharged therefrom at will through a valve or shutter provided for the purpose in the lower part of the trough B.

Certain modifications can be made in the construction of the blower to enable it to dry other substances besides grain, among which may be named fruits of various kinds, and cotton which may have been wet and picked from the bales. In order to adapt it to drying purposes suitable pipes must be provided to introduce hot, dry air into the inlet-openings of the blower.

I claim—

1. In a machine for cleaning, drying, and elevating purposes, a fan-blower provided with an outlet-trough, B, extending a short distance in a horizontal direction, then curved upwardly, then backwardly toward the blower, branching into two pipes, F'' F', the latter of which curves downwardly, terminating in the inlet-spout G, through which the material being cleaned will be drawn by suction into the center of the blower and be discharged therein between two perforated diaphragms, so arranged as to prevent the grain from being struck and broken by the wings of the fan, substantially as shown and described.

2. In a machine for cleaning, drying, and elevating purposes, a fan-blower provided with a continuous outlet trough or pipe, B, having branch pipes F' and F'', and switch-valve f' the former leading back into the blower, and the latter arranged to discharge the contents of pipe B into a screen, R, substantially as described, and for the purposes set forth.

3. In a machine for cleaning, drying, and elevating purposes, a fan-blower provided with a trough, B, so arranged as to carry a blast of air for driving grain or other produce continuously through the same and back again into the blower through one or more spouts, G and from thence discharging such material between two or more perforated screens or diaphragms, K K', located within the blower, and separating the material under treatment from the fan-blades, substantially as shown and described.

4. In a machine for cleaning, drying, an elevating purposes, a fan-blower provided with a continuous return and outlet pipe, B, having its inner surface slightly corrugated or undulating transversely, and partly or wholly covered with some abrasive substance, said pipe B being divided into two branch pipes, F' F", and provided with the valve f', so arranged as to permit the contents of the trough B to be thrown at will in either pipe F' or F", or partly into each, at the same time, as shown and described.

5. In a machine for cleaning, drying, and elevating purposes, a fan-blower having one or more inlet-spouts, G, opening at the center of the blower A, between perforated diaphragms which separate the material under treatment from the fan-blade, as shown and described.

MORTON TOULMIN.

Witnesses:
H. AUBREY TOULMIN,
J. J. McCARTHY.